March 14, 1967     J. R. AYMAR     3,309,513
FLASH HOLDER FOR CAMERAS
Filed April 13, 1966
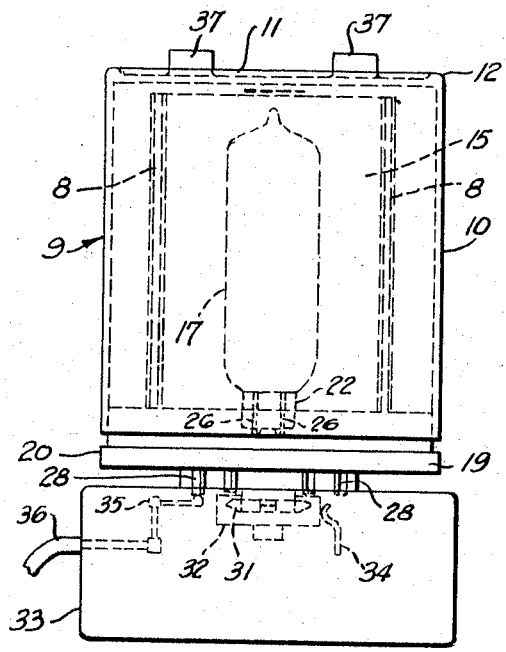
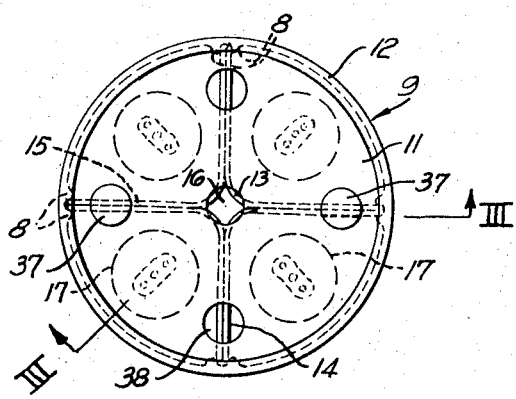
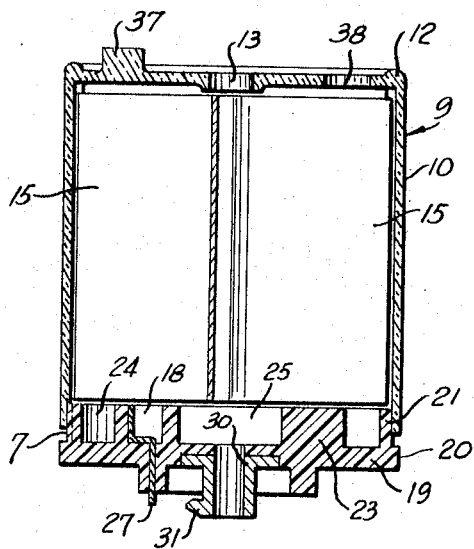
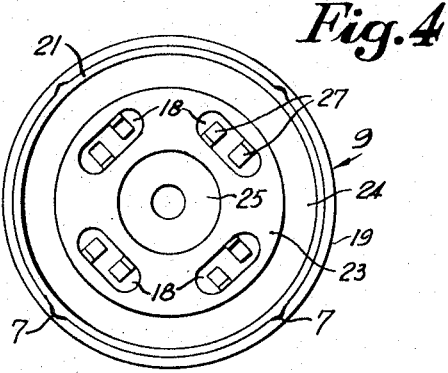
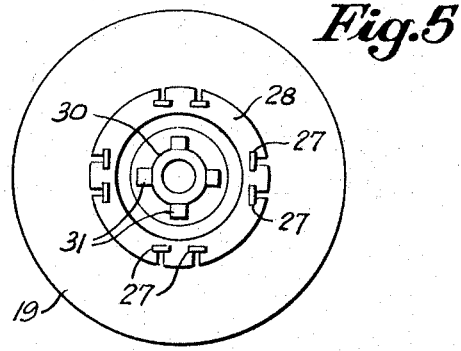
INVENTOR.
JULIAN ROBERT AYMAR
BY
Richards & Geier
ATTORNEYS

United States Patent Office 3,309,513
Patented Mar. 14, 1967

3,309,513
FLASH HOLDER FOR CAMERAS
Julian Robert Aymar, 5122 Fort Hamilton Parkway,
Brooklyn, N.Y. 11219
Filed Apr. 13, 1966, Ser. No. 542,355
2 Claims. (Cl. 240—1.3)

This invention relates to a flash holder attached to and used in conjunction with a photographic camera, and refers more particularly to a flash holder of this type which contains several lamps capable of being fired in succession.

Flash holders now in use are rather bulky and inconvenient to operate. They require a large reflector so that when they are attached to a camera it is difficult for the operator to direct and use the camera properly. An operator desirous to take several flash shots in rapid succession must waste time in switching from one lamp to the next one.

An object of the present invention is to eliminate drawbacks of prior art constructions and to provide a flash holder attachment for cameras which is so small in size that it will not obstruct the regular use of the camera and which can be quickly and easily used by an operator to shift from one lamp to the next one until the entire supply of lamps in the flash holder has been exhausted.

Other objects of the present invention will become apparent in the course of the following specification.

In the accomplishment of the objectives of the present invention it was found desirable to provide a flash holder having the shape of a small rotary cylinder made of transparent material and divided by inner reflecting walls into a plurality of compartments each of which contains a flash lamp. A base supporting the cylinder carries the sockets for the lamps. The base is constructed so as to support the cylinder firmly but without undue pressure to prevent breakages; it has a reinforcing edge providing a convenient finger grip. Suitable metal contacts are provided to establish electrical connections between each lamp when it is in the firing position, a source of electrical energy and the camera shutter switch.

The invention will appear more clearly from the following detailed description when taken in connection with the accompanying drawings showing by way of example, a preferred embodiment of the inventive idea.

In the drawings:

FIGURE 1 is a side view of a flash holder constructed in accordance with the present invention. The flash holder is illustrated as being mounted upon a base.

FIGURE 2 is a top view of the flash holder.

FIGURE 3 is a transverse section along the lines III—III of FIG. 2 with the lamps removed.

FIGURE 4 is a top view of the base also with the lamps removed.

FIGURE 5 is a rear view of the base.

The flash holder shown in the drawings includes a rotary cylindrical container 9 for the flash lamps. The container has a cover with cylindrical side walls 10 and a top 11 both made of a suitable strong transparent material. The top 11 has an annular edge bead 12 and a central opening 13 for the escape of possible flash gases. Furthermore, the top has two opposed pins 37 and two opposed holes 38 of the same diameter.

In the example illustrated the interior of the container is divided into four equal sections 14 by reflecting walls 15 consisting of a suitable light reflecting sheet of metal which is bent to form four double layers extending at right angles to each other and joined by inner curved portions which enclose a central space 16 (FIG. 2). The walls 15 fit tightly inside the container walls 10 between four pairs of ribs 8.

A separate flash lamp 17 is located in each space 14. The flash lamps 17 are of the type well known in the art and their ends 22 fit into sockets 18 provided in a base plate 19.

The base plate 19 is preferably made of a plastic material and has an outer annular ridge 20 which can be easily grasped by the user so that it will facilitate the turning of the flash holder. The plate 19 carries a round annular wall 21 which fits into the lower edge portion of the cylinder 10. The wall 21 has ribs 7 engaging the cylinder 10.

The sockets 18 are formed in a round portion 23 of the plate 19 which is separated from the wall 21 by an annular groove 24 and which encloses an inner space 25. As shown in FIG. 4, the four sockets 18 extend tangentially to the round surfaces of the portion 23.

Each flash lamp 17 has two wires 26 extending out of its end 22 and constituting the two terminals of the lamp. Each socket 18 carries two current transmitting metal contacts 27 adapted to engage the wires 26. Each contact 27 is of stepped formation, namely, it has an upper vertical portion extending adjacent a surface of the socket 18, an intermediate horizontal portion located upon the bottom of the socket 18 and a lower vertical portion. As shown in FIG. 4 the upper portions of two contacts 27 extend adjacent opposed surfaces of the same socket 18. The lower portions of the contacts 27 extend through a lower sleeve 28 constituting a part of the plate 19; their ends project beyond the sleeve.

The plate 19 also carries a central downwardly extending sleeve 30 the lower end of which extends beyond the sleeve 28 and is provided with four angular projections 31. As shown in FIG. 1, the projections 31 fit into corresponding recesses provided in a rotary plate 32 located in a base 33. The base 33 carries a battery (not shown) and is attached to the top of a camera. A spring 34 is used to hold the plate 32 and, consequently, the flash holder, in any one of four operative positions by engaging into suitable recesses (not shown). Two resilient contacts 35 engage the two contacts 27 connected with the lamp located in the operative position. The contacts 35 are connected with a connecting cord 36 leading to the camera operating switch. The cord 36 is also connected to said battery. As soon as a picture has been taken, the user turns the flash holder until the contacts 27 of the next flash lamp are engaged by the contacts 35. It is apparent that the turning of the flash holder can be accomplished easily and effectively in one or two seconds so that four flash pictures can be taken in very rapid succession. The removal of the used lamps and their replacement by new ones can be also carried out very quickly.

Furthermore, according to the present invention the camera can carry two flash holders at the same time, the second flash holder being mounted upside down upon the first flash holder, with the pins 37 of the first flash holder extending into holes 38 of the second flash holder. Obviously, only one flash holder is used for the taking of pictures. When the lamps of the first flash holder are used up, it is removed and the second flash holder is inserted into the plate 19. Thus the user need not carry a reserve flash holder separately from the camera.

It is apparent that the specific embodiment described above has been given solely by way of illustration and not by way of limitation and that it is subject to many variations and modifications within the scope of the present invention. For example, the flash holder may contain less or more than four lamps. All such and other variations and modifications are to be included within the scope of the present invention.

What is claimed is:

1. A flash holder comprising a rotary transparent container, inner reflecting walls in said container dividing the interior thereof into a plurality of compartments of the same size, a supporting plate carrying said container and rotatable therewith, said supporting plate having flash lamp sockets, each of said sockets being located in a separate compartment, and flash lamp contacts located in said sockets and extending through said supporting plate, said container comprising a top having an opening communicating with all of said compartments, wherein said top comprises two opposed pins and two openings for receiving pins of another top.

2. A flash holder in accordance with claim 1, further comprising a sleeve integral with said plate, said sleeve being centrally located upon said plate and extending downwardly from the lower surface thereof, said contacts extending through openings formed in said sleeve, another sleeve integral with said plate, said other sleeve being smaller than and concentrical relatively to the first-mentioned sleeve and extending downwardly from the lower surface of said plate, and actuating projections extending radially from the second-mentioned sleeve, the number of said projections being equal to that of said compartments.

References Cited by the Examiner

UNITED STATES PATENTS

| | | | |
|---|---|---|---|
| 2,622,188 | 12/1952 | Seeger et al. | 240—37 X |
| 2,641,687 | 6/1953 | Akely | 240—47 X |
| 3,096,025 | 7/1963 | Prochnow | 240—37 X |
| 3,244,087 | 4/1966 | Anderson et al. | 240—1.3 |

FOREIGN PATENTS

| | | |
|---|---|---|
| 833,676 | 4/1960 | France. |
| 1,148,448 | 5/1963 | Germany. |

NORTON ANSHER, *Primary Examiner.*